US010601819B1

(12) United States Patent
Prasad et al.

(10) Patent No.: US 10,601,819 B1
(45) Date of Patent: *Mar. 24, 2020

(54) PUBLIC AUTHENTICATION SYSTEMS AND METHODS

(71) Applicant: United Services Automobile Association (USAA), San Antonio, TX (US)

(72) Inventors: Bharat Prasad, San Antonio, TX (US); Charles Lee Oakes, III, Boerne, TX (US); Gunjan C. Vijayvergia, San Antonio, TX (US); Vijay Jayapalan, San Antonio, TX (US); Thomas Bret Buckingham, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,421

(22) Filed: Dec. 20, 2018

Related U.S. Application Data

(63) Continuation of application No. 15/365,520, filed on Nov. 30, 2016, now Pat. No. 10,164,973.

(Continued)

(51) Int. Cl.
*H04L 29/06* (2006.01)
*G06Q 20/10* (2012.01)

(52) U.S. Cl.
CPC ......... *H04L 63/0853* (2013.01); *G06Q 20/10* (2013.01); *H04L 63/083* (2013.01);
(Continued)

(58) Field of Classification Search
CPC ... H04L 63/08; H04L 63/0853; H04L 63/083; H04L 63/0861; H04L 63/0876; H04L 63/102; G06Q 20/10
See application file for complete search history.

(56) References Cited

U.S. PATENT DOCUMENTS 6,154,879 A 11/2000 Pare, Jr. et al.
6,233,565 B1 5/2001 Lewis et al.
(Continued)

FOREIGN PATENT DOCUMENTS

AU 2016101183 A4 9/2016
CN 105681301 A 6/2016
(Continued)

*Primary Examiner* — Hosuk Song
(74) *Attorney, Agent, or Firm* — Fletcher Yoder, P.C.

(57) ABSTRACT

Techniques provided herein relate to electronic authentication on public systems. A backend system receives at least one electronic data action request from a publicly available client system that is shared amongst a plurality of users. At least a portion of the primary authentication information is received from a secondary device separate from the publicly available client system. The electronic data action request is authenticated by determining if the primary authentication information matches expected primary authentication information that is expected to complete the electronic data action request. Performance of the electronic data action request is facilitated when the primary authentication information matches the expected primary authentication information.

19 Claims, 7 Drawing Sheets

Related U.S. Application Data

(60) Provisional application No. 62/262,215, filed on Dec. 2, 2015, provisional application No. 62/262,224, filed on Dec. 2, 2015, provisional application No. 62/262,231, filed on Dec. 2, 2015.

(52) U.S. Cl.
CPC ...... *H04L 63/0861* (2013.01); *H04L 63/0876* (2013.01); *H04L 63/102* (2013.01); *H04L 2463/082* (2013.01)

(56) References Cited

U.S. PATENT DOCUMENTS

| | | | |
|---|---|---|---|
| 6,697,806 | B1 | 2/2004 | Cook |
| 6,898,633 | B1 | 5/2005 | Lyndersay et al. |
| 6,920,559 | B1 * | 7/2005 | Nessett ................ H04L 9/0822 380/247 |
| 8,291,236 | B2 * | 10/2012 | Vantalon ................ H04N 5/913 348/E5.004 |
| 8,510,820 | B2 * | 8/2013 | Oberheide .......... H04L 63/0272 709/203 |
| 9,009,778 | B2 | 4/2015 | Pearce et al. |
| 9,042,608 | B2 | 5/2015 | Black |
| 9,043,887 | B2 * | 5/2015 | McLachlan ............. H04L 63/08 705/2 |
| 9,195,834 | B1 * | 11/2015 | Jakobsson ............... G06F 21/31 |
| 9,240,887 | B2 * | 1/2016 | Hamlin ............... H04L 63/0428 |
| 9,569,771 | B2 | 2/2017 | Lesavich et al. |
| 9,686,272 | B2 | 6/2017 | Blinn |
| 9,722,790 | B2 | 8/2017 | Ebrahimi |
| 9,774,578 | B1 | 9/2017 | Ateniese et al. |
| 10,164,973 | B1 * | 12/2018 | Prasad ................ H04L 63/0853 |
| 2009/0210328 | A1 | 8/2009 | Fomenko et al. |
| 2015/0278820 | A1 | 10/2015 | Meadows |
| 2015/0332395 | A1 | 11/2015 | Walker et al. |
| 2015/0356524 | A1 | 12/2015 | Pennanen |
| 2015/0356555 | A1 | 12/2015 | Pennanen |
| 2015/0371224 | A1 | 12/2015 | Lingappa |
| 2015/0379510 | A1 | 12/2015 | Smith |
| 2016/0203477 | A1 | 7/2016 | Yang et al. |
| 2016/0261411 | A1 | 9/2016 | Yau et al. |
| 2016/0321751 | A1 | 11/2016 | Creighton, IV et al. |
| 2016/0330027 | A1 | 11/2016 | Ebrahimi |
| 2016/0358165 | A1 | 12/2016 | Maxwell |
| 2016/0365978 | A1 | 12/2016 | Ganesan et al. |
| 2017/0053249 | A1 | 2/2017 | Tunnell et al. |
| 2017/0076280 | A1 | 3/2017 | Castinado et al. |
| 2017/0076286 | A1 | 3/2017 | Castinado et al. |
| 2017/0078299 | A1 | 3/2017 | Castinado et al. |
| 2017/0103391 | A1 | 4/2017 | Wilson, Jr. et al. |
| 2017/0109748 | A1 | 4/2017 | Kote |
| 2017/0140375 | A1 | 5/2017 | Kunstel |
| 2017/0177898 | A1 | 6/2017 | Dillenberger |
| 2017/0206382 | A1 | 7/2017 | Rodriguez De Castro et al. |
| 2017/0228704 | A1 | 8/2017 | Zhou et al. |
| 2017/0230375 | A1 | 8/2017 | Kurian |
| 2017/0232300 | A1 | 8/2017 | Tran et al. |
| 2017/0244707 | A1 | 8/2017 | Johnsrud et al. |
| 2017/0250972 | A1 | 8/2017 | Ronda et al. |
| 2017/0278186 | A1 | 9/2017 | Creighton, IV et al. |
| 2017/0279801 | A1 | 9/2017 | Andrade |
| 2017/0287068 | A1 | 10/2017 | Nugent |
| 2017/0289111 | A1 | 10/2017 | Voell et al. |

FOREIGN PATENT DOCUMENTS

| | | |
|---|---|---|
| CN | 106230808 A | 12/2016 |
| CN | 106230852 A | 12/2016 |
| CN | 106408299 A | 2/2017 |
| CN | 106484836 A | 3/2017 |
| CN | 106504091 A | 3/2017 |
| KR | 101590076 B1 | 2/2016 |
| KR | 101591244 B1 | 2/2016 |
| KR | 20160150278 A | 12/2016 |
| KR | 101762245 B1 | 7/2017 |
| KR | 101773073 B1 | 8/2017 |
| KR | 101773074 B1 | 8/2017 |
| KR | 101780636 B1 | 9/2017 |
| WO | 2016036969 A1 | 3/2016 |
| WO | 2017006134 A1 | 1/2017 |
| WO | 2017006135 A1 | 1/2017 |
| WO | 2017006136 A1 | 1/2017 |
| WO | 2017021154 A1 | 2/2017 |
| WO | 2017044554 A1 | 3/2017 |
| WO | 2017066715 A1 | 4/2017 |
| WO | 2017079795 A1 | 5/2017 |
| WO | 2017091530 A1 | 6/2017 |
| WO | 2017104899 A1 | 6/2017 |
| WO | 2017119564 A1 | 7/2017 |
| WO | 2017136956 A1 | 8/2017 |
| WO | 2017139688 A1 | 8/2017 |
| WO | 2017146333 A1 | 8/2017 |

\* cited by examiner

PUBLIC AUTHENTICATION SYSTEMS AND METHODS

CROSS REFERENCE TO RELATED APPLICATION

This application is a continuation of U.S. application Ser. No. 15/365,520, now U.S. Pat. No. 10,164,973, entitled "PUBLIC AUTHENTICATION SYSTEMS AND METHODS," filed Nov. 30, 2016, which claims priority to and the benefit of U.S. Provisional Application No. 62/262,215, entitled "MULTI-FACTOR AUTHENTICATION SYSTEMS AND METHODS," filed Dec. 2, 2015; and U.S. Provisional Application No. 62/262,224, entitled "BLOCK CHAIN AUTHENTICATION SYSTEMS AND METHODS," filed Dec. 2, 2015; and U.S. Provisional Application No. 62/262,231, entitled "PUBLIC AUTHENTICATION SYSTEMS AND METHODS," filed Dec. 2, 2015. All of the above-referenced patent applications are hereby incorporated by reference in their entirety for all purposes.

BACKGROUND

The present disclosure relates generally to systems and methods for electronic authentication of users. More specifically, the present disclosure relates to multi-factor authentication techniques that increase security by providing complex authentication of a user, while reducing inconvenience to the users being authenticated.

As electronic technology becomes increasingly affordable and powerful, commerce is increasingly conducted electronically online. Modern businesses typically offer access to services and sensitive data via online portals (e.g., the Internet), which may be accessed from numerous sites across the globe. Because the data and/or services provided by these businesses may be quite valuable, nefarious individuals may attempt to impersonate a user from one of the access sites, in an effort to gain unauthorized access to the data and/or to initiate unauthorized service transactions. To curb these efforts, businesses may implement primary authentication processes, as well as secondary authentication processes. For example, certain modern businesses have traditionally asked for username/password combinations as a primary authentication method. Further, these businesses may ask a user for answers to personal questions, which may act as a secondary mechanism for authenticating the user. Unfortunately, these secondary mechanisms may be quite inconvenient for the users. For example, the login process may become more complex, requiring a user to remember and enter answers to secondary questions. This may be quite cumbersome and inefficient. Accordingly, improved techniques for multi-factor (e.g., secondary) authentication are desired.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward improved systems and methods of multi-factor authentication for performance of electronic actions (e.g., accessing electronic data and/or modifying electronic data). Specifically, as will be described in detail below, the techniques discussed herein may enable multiple factors of authentication to occur, while reducing a user input burden. Present embodiments address post-Internet issues that have arisen with respect to protecting against unauthorized access/modification to data and with respect to inefficiencies of traditional authentication techniques that have become overly cumbersome in efforts to address more sophisticated threats.

More specifically, in accordance with present embodiments, a user and/or user identifier requesting the performance of electronic actions at a client computer may provide authenticating information to illustrate that the user and/or user identifier is permitted for action performance via data and device associations that may avoid requiring a user to perform multiple password entries. An electronic device other than the client may be associated with the user and/or user identifier. Information related to and/or provided from this electronic device may be used to provide a secondary authentication of the user and/or user identifier, resulting in a multi-factor authentication that may occur without secondary user input.

Multi-Factor Authentication

Figure 1:
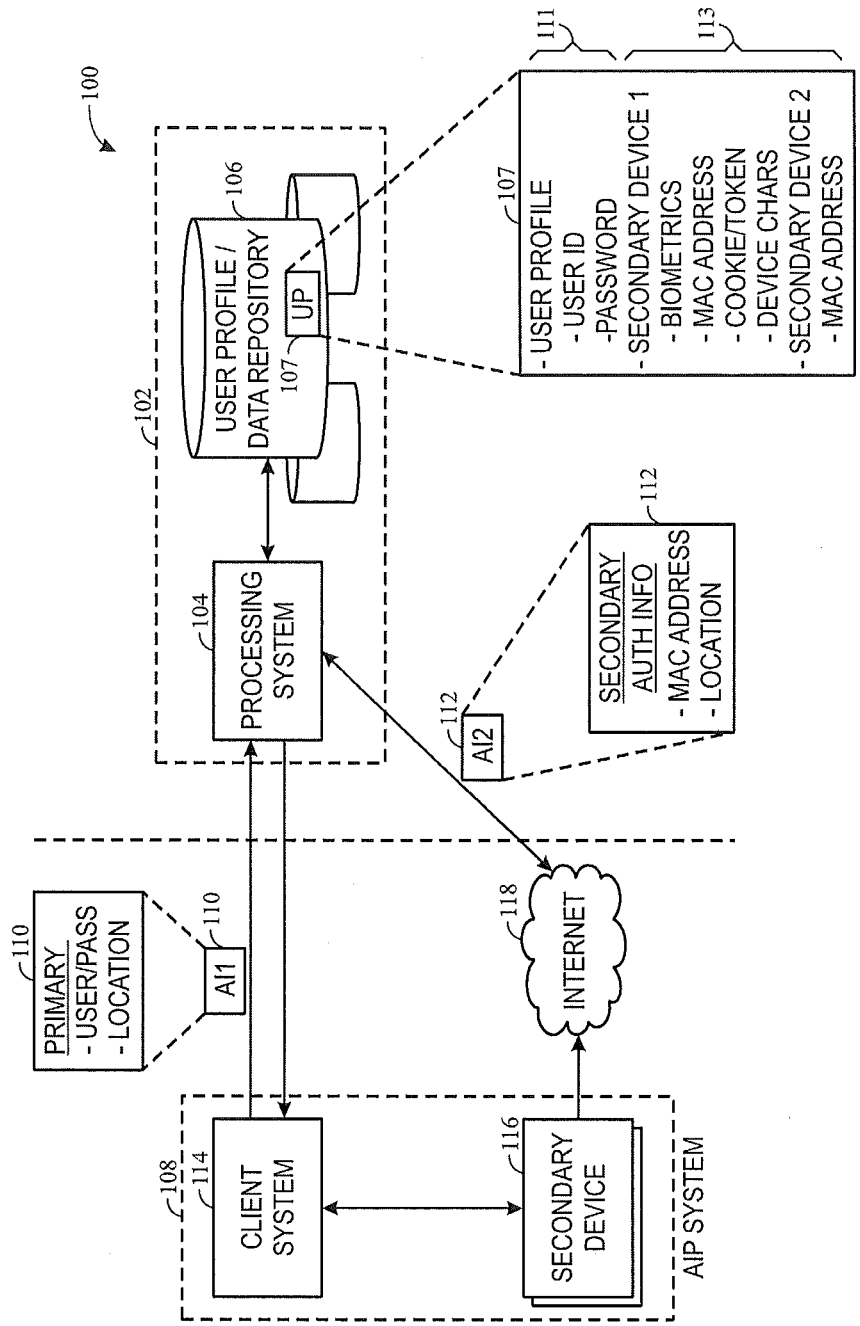
FIG. 1 is a schematic representation of a multi-factor authentication system, in accordance with an embodiment.
Figure 2:
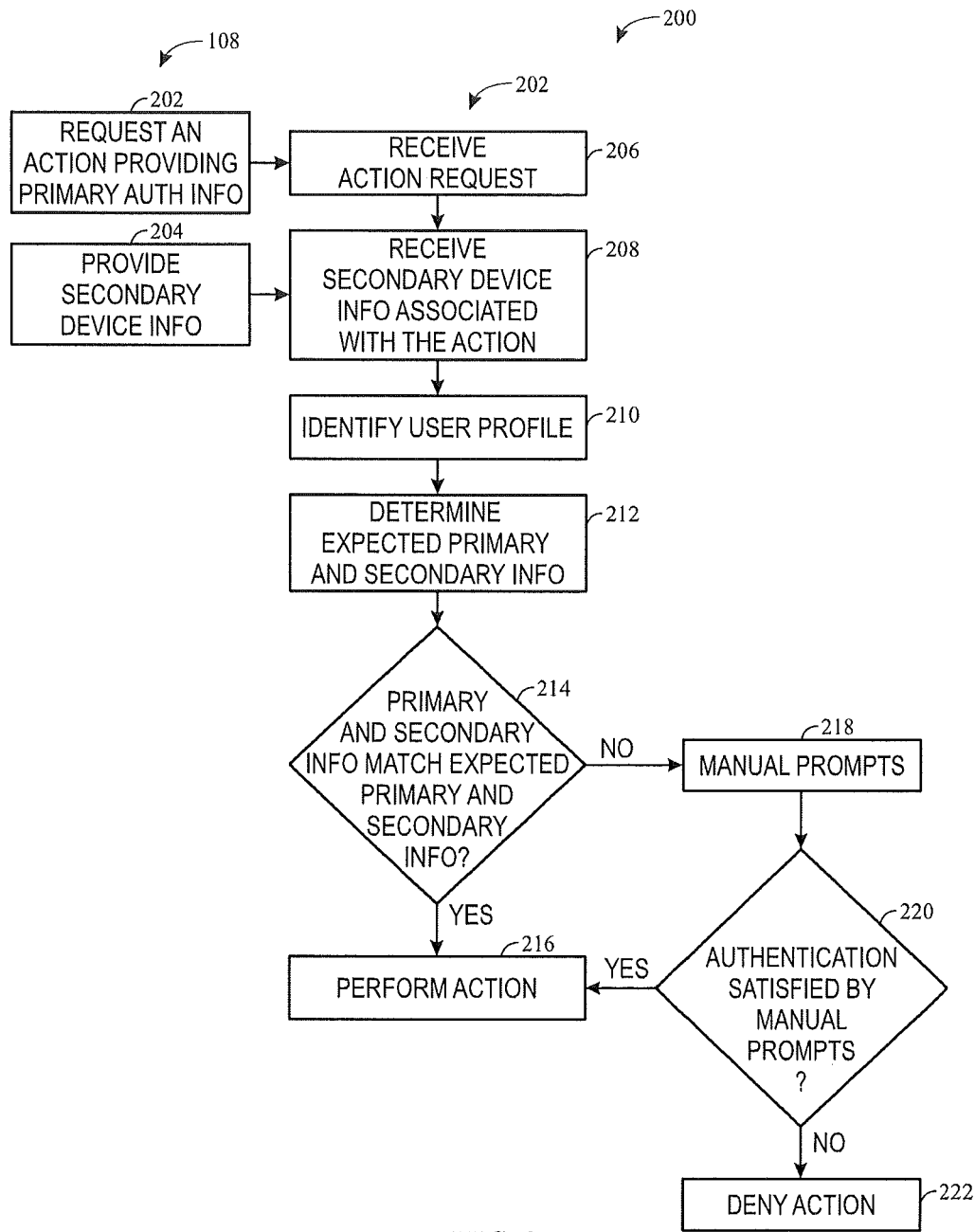
FIG. 2 is a flowchart, illustrating a process for implementing multi-factor authentication, in accordance with an embodiment.

Turning first to a discussion of an overall multi-factor authentication system, FIG. 1 is a schematic representation of a multi-factor authentication system 100, in accordance with an embodiment. FIG. 2 is a flowchart, illustrating a process 200 for implementing multi-factor authentication using the system 100 of FIG. 1, in accordance with an embodiment. For clarity, FIGS. 1 and 2 will be discussed together.

A backend system 102 may perform electronic data actions based upon received requests for such data actions, when the backend system 102 authenticates a source of the request as having authority or access to request the action's performance. The backend system 102 may be a system for processing electronic actions that is not directly accessible by a user. For example, the backend system 102 may include a processing system 104 and/or databases 106 (e.g., that holds user profile data 107 and/or other electronic data). The processing system 104 may perform electronic data actions by utilizing data from the databases 106. In one embodiment, the databases 106 may include user profiles 107 associated with certain electronic data stored in the databases 106. The processing system 104 may authenticate or confirm that the requests to perform electronic data actions are associated with authorized user profiles 107, such that actions may only occur by authenticated users.

In one embodiment, the backend system 102 may include financial records for users. The requested electronic data action may be a request to access the user's financial records, modify the user's financial records (e.g., debit or credit a financial account), etc. Access and/or modification of the user's financial records may be allowed by the backend system 102 only after authenticating that the user requesting the action is authorized to request performance of the action. In other words, a user's financial records may be accessed and/or modified only upon authenticating that the user requesting the access and/or modification has sufficient rights for the action's performance.

As mentioned above, primary authentication may oftentimes include asking a user for a username and password combination associated with the user. However, because username and password combinations may sometimes be obtained by users not associated with the username and password, additional authentication factors may be used to authenticate the user requesting the electronic data action. Accordingly, multi-factor authentication may provide multiple authentication mechanisms to authenticate a validity of a source of the request to perform an electronic data activity. Traditional secondary authentication may include answers to questions. However, this information may also be acquired by unauthorized users.

In one embodiment of the present disclosure, an authentication information provision (AIP) system 108 may provide a request for an electronic data action (block 202). This may include transmitting a request to read, write, and/or modify electronic data from a client to the backend system 102. In the request (or in addition to the request) the AIP system 108 may provide information useful for authenticating a user requesting an electronic data action's performance. For example, the AIP system 108 may provide primary authentication information 110 (block 202) and/or secondary authentication information 112 (block 204) to the backend system 102. The information 110, 112 may be received by backend system 102 (e.g., primary authentication information in block 206 and secondary authentication information in block 208).

Primary authentication information 110 may be a first set of authentication information that first identifies the user requesting performance of an electronic data action. This primary authentication information 110 may be used to identify a user profile 107 (e.g., of a set of user profiles in the repository 106) associated with the primary authentication information 110 (block 210). For example, a unique username may be used to identify a user profile 107 associated with the username. Alternatively, characteristics and/or identities of the client system 114 and/or the secondary device 116 may be used to determine a user profile 107 associated with the characteristics and/or identities. For example, a media access control (MAC) address of the client 114 and/or secondary device 116 may be associated with a particular user profile 107. Accordingly, this information may be used to identify a proper user profile 107.

Information in the user profile 107 may confirm that the primary authentication information 110 is correct and that secondary information 112 is also correct. For example, the user profile 107 may include user information 111, such as a user identifier and password combination. Further, the user profile 107 may include secondary device information 113 related to secondary devices associated with the user and/or information related to other aspects of the AIP system 108. Accordingly, the backend system 102 may determine expected primary information (e.g., a password) and/or secondary information (e.g., secondary device MAC address) that may be used to authenticate the user (block 212). For example, in one embodiment, the expected primary authentication information may be derived from the user information 111 and the expected secondary authentication information may be derived from the secondary device information 113. Alternatively, the expected primary authentication information may be derived from the secondary device information 113 and the secondary authentication information may be obtained from the user information 111.

Once the expected primary information and/or secondary information is determined, the backend system may determine whether or not the primary information and/or secondary information received in blocks 206 and 208 match the expected primary information and/or secondary information (decision block 214). When the primary authentication information 110 and the secondary authentication information 112 matches the expected primary authentication information and secondary authentication information determined in block 212, the backend system may perform the action (block 216). Otherwise, when there is no match of the primary authentication information 110 and the secondary authentication information 112 with the expected primary authentication information and secondary authentication information determined in block 212, the backend system may provide manual authentication prompts (e.g., secondary security questions that, when answered correctly, may increase the likelihood that the user is the user associated with the user profile) (block 218). A determination is made as to whether or not the manual prompt results satisfy authentication (decision block 220). When the manual prompt results satisfy authentication, the action may be performed (block 216). However, when the authentication is not satisfied, performance of the action is denied (block 222). In some embodiments, authentication by manual prompts is not an option.

In the illustrated embodiment, the AIP system 108 includes a client system 114 and a secondary device 116. The client system 114 is a computer system that may provide a graphical user interface (GUI) for interacting with the backend system 102. For example, the client system 114 may include an Internet browser that may access a web server hosting an interface to the electronic data. The GUI may enable a user to request performance of an electronic data action. For example, the user may request access and/or viewing of financial records associated with the user, by logging into the interface.

In some embodiments, the login information (e.g., a username and password combination) may be the primary authentication information 110. As illustrated, in the current embodiment, the client 114 provides the primary authentication information 110. However, in some embodiments, other devices, such as a secondary device 116 may provide the primary authentication information 110. For example, the primary authentication information 110 may be a unique identifier (e.g., Media Access Control (MAC) address, Internet Protocol (IP) address, universal unique identifiers (UUIDs), etc.), of the secondary device 116 associated with the user and/or a unique identifier of the user. A user profile 107 associated with the primary authentication information 110 may be selected for further authentication.

As discussed above, additional factors may be useful in authenticating a user requesting performance of an electronic data action. In some embodiments, the additional factors may be sourced from the client 114 and/or secondary device 116 that is associated with the user. For example, in some embodiments the secondary device 116 may be a smart phone, tablet computer, smart watch, smart fitness tracker wearable, or other smart device associated with the user. The secondary authentication information may include information obtained via sensors of the secondary device 116, such as biometric information (e.g., facial recognition information and/or fingerprint information) obtained from a camera or other biometric sensor. In some embodiments, a MAC address of the secondary device 116, a location of the secondary device 116, cookies and/or tokens provided by the secondary device 116, and/or other secondary device 116 characteristics may be used as secondary authentication information.

Further, such data may be accumulated into an identification pattern or model associated with the user and then used to determine whether there is sufficient overlap with detected data to authenticate the user. For example, an accumulation of request characteristics, such as typical request times, typical request locations, typical electronic actions requested, etc. may be accumulated. Further, information about the client 114 and/or the secondary devices 116 may be accumulated, such as identification information, operational characteristics, etc. This accumulated information may be used in subsequent authentications. For example, the user may be authenticated if certain combinations of information are present, if a certain amount of overlap exists between the available information at the time of the request and the information previously accumulated, etc. In one embodiment, if a threshold amount of secondary authentication information (e.g., 5 pieces of information, 30% of accumulated information, etc.) is available, the user may be authenticated. For illustration, in one example, when a user requests an electronic action, the time of the request, source location of the request, an identifier for a paired smart phone, and an identifier for a vehicle paired with the smart phone are all available. Each of these pieces of information may be compared with previous authentication information associated with the user. If a threshold amount of overlapping information exists, the user may be authenticated. Additionally and/or alternatively, if certain combinations of information are present, the user may be authenticated. For example, if a request comes from a location known to be at or near the user's workplace and the time of the request is during the user's typical working hours, it may be more likely that the user is authentic. Accordingly, this combination of information may be used to authenticate the user.

In some embodiments, the secondary authentication information 112 may be provided directly by the secondary device 116 to the backend 102. For example, when connected to the Internet 118, the secondary authentication information 112 may be provided to the backend system 102 via the Internet 118. In other embodiments, when the secondary device 116 is communicatively coupled to the client system 114, the secondary authentication information may be provided to the client system 114, which may provide the secondary authentication information to the backend system 102.

Alternatively, in some embodiments, the secondary authentication information 112 may be provided by the client system 114 (e.g., via a GUI). For example, when the primary authentication information 110 is not user input information from the client 114 GUI, the secondary authentication information 112 (e.g., a username and/or password) may then be obtained via such user input and authenticated against a user profile 107 selected based upon the primary authentication information 110.

As mentioned above, upon authentication, the electronic data action may be performed (block 216). For example, the user may be provided with a view of financial records at the client 114 (e.g., via a GUI). Further, a financial record modification, such a debit and/or credit may be performed.

Device Registration with the Backend System Via Blockchain and/or User Profiles

Figure 3:
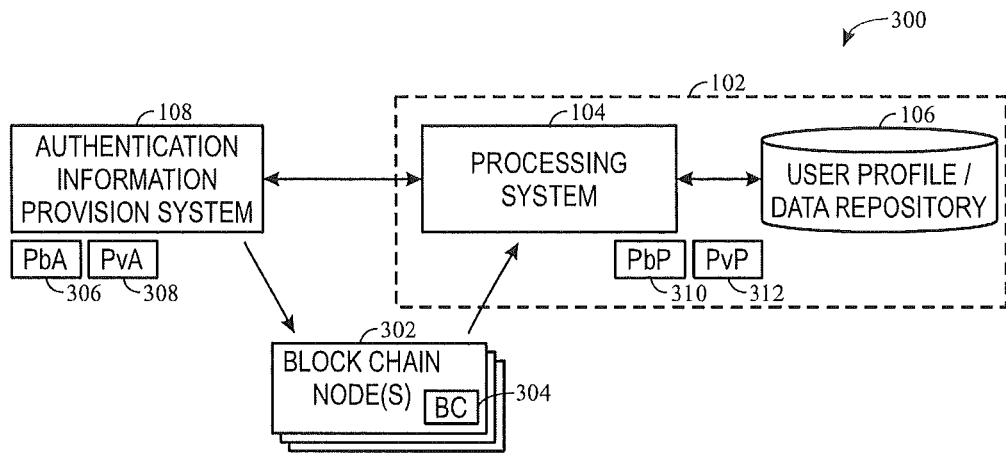
FIG. 3 is a schematic representation of a block-chain system, in accordance with an embodiment.

In the embodiment of FIG. 1, the primary authentication information and the secondary authentication information is derived from a user profile 107, which may include a pattern or model incorporating numerous types and pieces of data. However, in some embodiments, the primary authentication information and/or the secondary authentication information may be derived from a source other than the user profile 107. FIG. 3 is a schematic representation of such a system 300, where authentication (e.g., primary authentication information and/or secondary authentication information) is sourced from a block-chain, in accordance with an embodiment.

In the system 300, one or more block chain nodes 302 may host copies of a block chain 304. For example, the block chain nodes 302 may be computers that are communicatively coupled to the AIP system 108 and the backend 102. The nodes 302 may store the block chain 304 in a storage device (e.g., non-volatile memory) accessible by the nodes 302. As used herein, a block chain refers to a distributed data store that maintains a dynamic list of data records that are hardened against tampering and revision. For example, in the current embodiments, the block chain may be a data store that maintains primary authentication information 110 and/or secondary authentication information 112. For example, in one embodiment, the block chain 304 may include user information 111 and/or secondary device information 113 that may be useful for multi-factor authentication. As a specific example, data forming the block chain 304 may include a home IP address of the user, a serial number of a router used in the user's home, paired smart device identifiers, particular network characteristics (e.g., network names, protocols, etc), data sourced from secondary devices 116 (e.g., cookies, tokens, etc.), identifiers of chained devices (e.g., devices that are indirectly paired via one or more intermediate paired devices), etc.

The information stored in the block chain 304 may be accessed by the processing system 104 or other backend 102 component, such that authentication of a user may occur, using the block chain 304 information. For example, the authentication may occur in accordance with the process 200 of FIG. 2, where the primary authentication information and/or the secondary authentication information received in blocks 206 and 208, respectively, is accessed from the block chain 304, rather than received from the AIP system 108.

Accordingly, the block chain system 300 may have certain advantages over other embodiments. For example, system 300 may include more storage-efficient user profiles, because certain information may be stored in the block chain 304, rather than the user profiles. Additionally, when multiple backend systems 102 exist, the storage may be more efficiently used, because the primary authentication information and/or secondary authentication information may be stored at a single set of block chain nodes 302 accessible by the multiple backend systems, rather than storing the authentication information in user profiles of each backend system.

As mentioned above, the block chain 304 may be hardened against tampering and revision. To do this, the block chain 304 may be encrypted using a public key 306 and private key 308 of the AIP system 108, along with a public key 310 and private key 312 of the processing system 104 (or other backend 102 component).

The AIP system 108 may encrypt the block chain 304 in a manner that can be read by only the backend system 102 (e.g., the processing system 104) or others having the private key 312 associated with the public key 310. To do this, the AIP system 108 may encrypt the block chain 304 using the processing system public key 310. The processing system 104 may then decrypt the block chain 304, using its own private key 312, while others without the private key 312 will not be able to decrypt the block chain 304.

In some embodiments, it may be desirable for both the AIP system 108 and the backend system 102 to access and/or modify the block chain 304. To do this, a shared secret key may be derived by both the AIP system 108 and the backend system 102. The shared secret may be derived by combining the public key of the AIP system 108 and the private key 312 of the processing system 104 at the processing system 104. Further, the same shared secret may be derived at the AIP system 108 by combining the public key 310 of the processing system 104 with the private key 308 of the AIP system 108. The shared secret may be used as a cypher to encrypt and/or decrypt the block chain 304 by both the AIP system 108 and the processing system 104.

Figure 4:
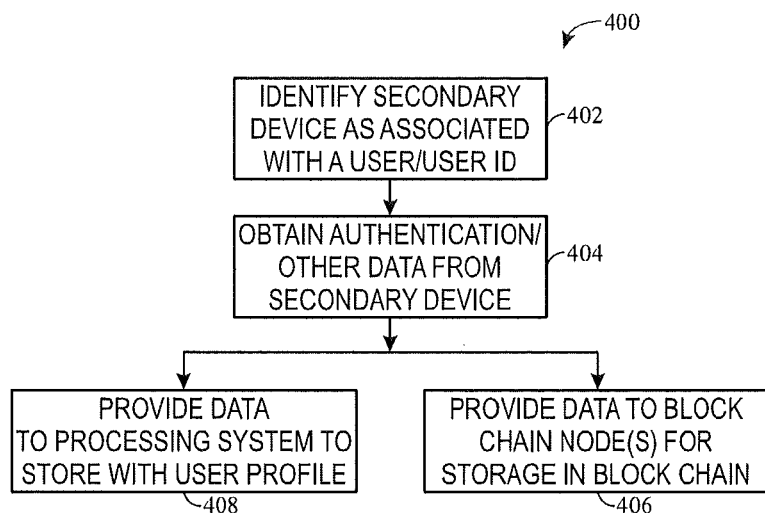
FIG. 4 is a flowchart, illustrating a process for registering secondary devices for multi-factor authentication, in accordance with an embodiment.

Having discussed storing authentication information in a block chain 304, the discussion now turns to registering secondary device authentication information for multi-factor authentication. FIG. 4 is a flowchart, illustrating a process 400 for registering secondary devices for multi-factor authentication, in accordance with an embodiment. To associate secondary device information useful for authentication with a user profile (e.g., user profile 107 of FIG. 1), an initial identification of secondary devices associated with a user and/or user identifier may be obtained (block 402). This may include automatic processes for detecting and associated secondary devices 116 and/or secondary device 116 information and/or may include manual setup prompts that facilitate association of the secondary devices 116 and/or secondary device 116 information with the user and/or user identifier (e.g., a user profile). For example, in one embodiment, a GUI prompt on the client system 114 and/or secondary device 116 may ask a user to provide an indication that the secondary device 116 is associated with the user.

In some embodiments, when a user attempts to request performance of an electronic data activity via the secondary device 116 (e.g., by entering primary authentication information on the secondary device 116), the secondary device 116 may be automatically identified as a secondary device 116 associated with the user's profile. For example, upon a user entering primary authentication information (e.g., via a smart phone or laptop), a polling of available secondary devices 116 may be performed. The polling may determine relevant authentication information available from the current secondary devices 116. For example, secondary device 116 identification information may be obtained, data from the secondary devices 116 may be obtained, etc.

Further, in some embodiments, secondary devices 116 that are communicatively paired with the client 114 (e.g., via wi-fi, Bluetooth, near field communications (NFC), universal serial bus (USB), or other communications protocol) may be identified as associated with the user's profile, when the client 114 provides the primary authentication information that identifies the user profile. In some embodiments, a confirmation prompt may request that the user confirm that the secondary device 116 should be associated with the client system 114. For example, the confirmation prompt may request that a user affirmatively agree that the paired secondary devices 116. In certain embodiments, such confirmation may be accepted within a limited time period after the initial pairing, a subsequent pairing or both.

Other secondary devices 116 may be automatically identified when the client system 114 pairs with secondary devices 116. For example, other secondary devices 116 paired to the secondary devices 116 pairing with the client system 116 may be automatically identified and associated with the client system 114.

In one example, a secondary device 116 (e.g., a smart phone) may be connected or "paired" to a client system 114 via USB. Additionally, an additional secondary device 116, such as an electronic wearable device (e.g., a health tracking wristband), may be paired with the client system 114 via Bluetooth communications or wi-fi. A user of the client system 114 may attempt to login or may specifically request registration of secondary devices 116 via a GUI of the client system 114. Upon logging in and/or requesting registration of secondary devices 116, a polling of paired secondary devices 116 may occur. From there, the paired devices may be automatically identified as associated with the user and/or user identifier or the user may be prompted (e.g., via the client system 114 GUI) to indicate particular ones of the secondary devices 116 found during the polling process that should be associated with the user and/or user identity.

In some embodiments, identification of secondary devices may not utilize polling, but instead may be accomplished via software applications of the secondary devices 116 (e.g., an app running on a smart phone) that provides an explicit indication to the client system 114 and/or backend system 102 that the secondary device 116 should be associated with the user and/or user identifier.

Once the secondary devices 116 that should be associated with the user and/or user identity are identified, particular authentication information and/or other data may be obtained from the secondary device 116 (block 404). For example, in certain embodiments, a MAC address of the secondary device 116 may be obtained. Additionally or alternatively, a serial number or other unique identifier of the secondary device may be obtained. Further, in some embodiments, data obtained from sensors of the secondary devices 116 may be obtained (e.g., biometric data, global positioning data, network data from a wifi network, etc.). In some embodiments, a cookie or token may be generated and stored on the secondary device, a reference to which may be obtained. Other information may be obtained as well. For example, information related to the pairing of the device 116, information related to software on the device 116, and/or information related to the hardware of the device 116 may be obtained.

Once the relevant data is obtained/gathered, at least a subset of the information may be provided to the block chain 304 (block 406) or the back end system 102 (e.g., to an associated user profile 107) (block 408). From there, the information is accessible by the backend system 102 for subsequent multi-factor authentication.

Figure 5:
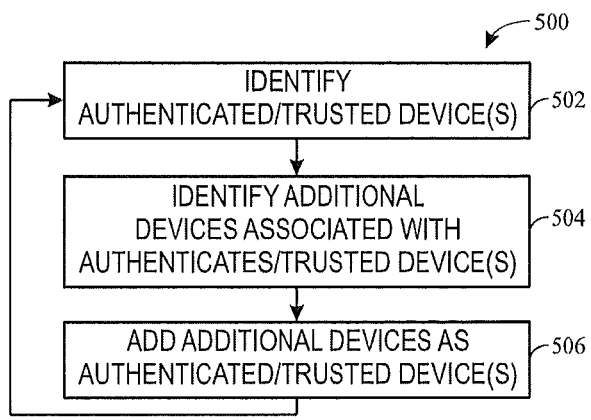
FIG. 5 is a flowchart illustrating a process for identifying secondary authentication devices, in accordance with an embodiment.
Figure 6:
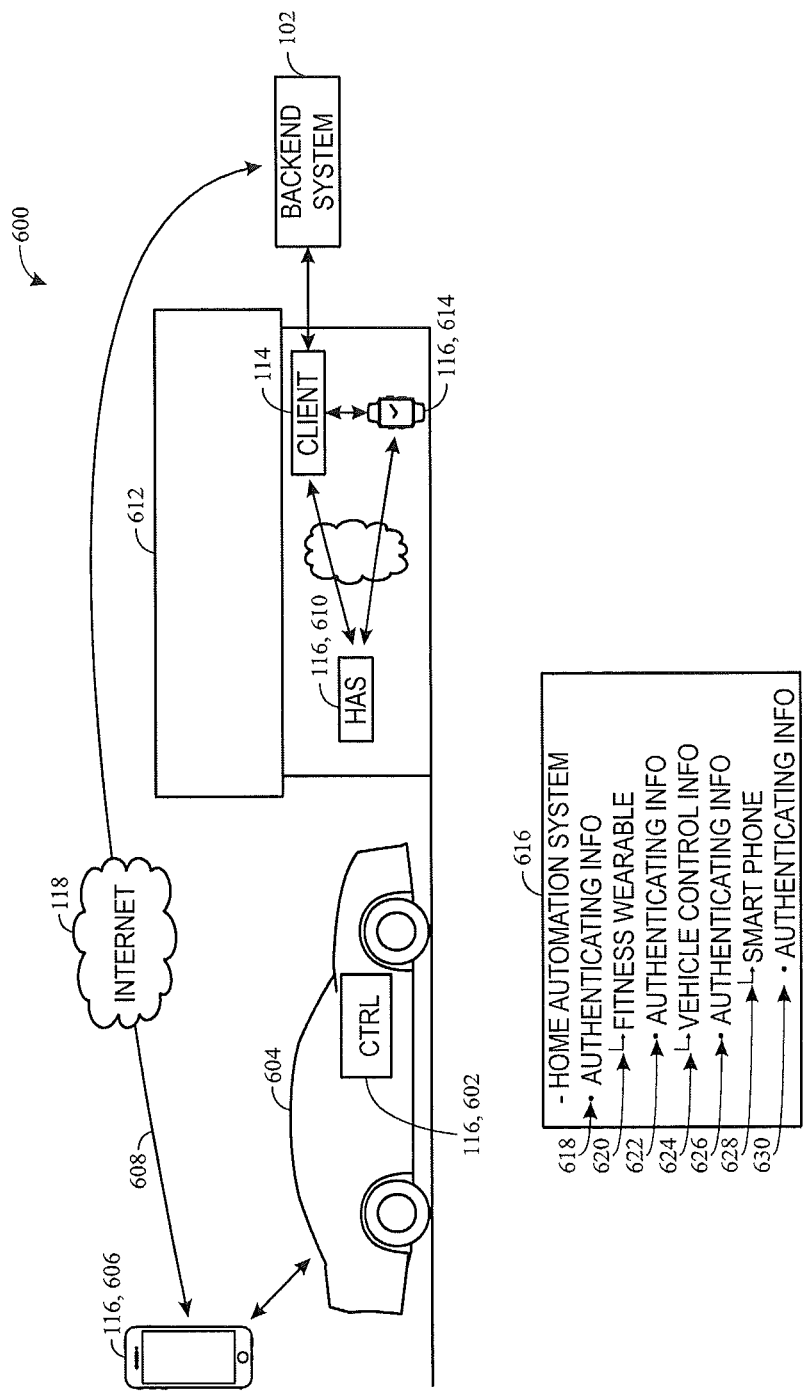
FIG. 6 is a schematic illustration of a system including smart-devices that are identified as secondary authentication devices, in accordance with an embodiment.

In some embodiments, pairing relationships between electronic devices may result in automatic registration of secondary devices 116. FIG. 5 is a flowchart illustrating a process 500 for identifying secondary authentication devices 116 based upon pairing relationships, in accordance with an embodiment. Further, FIG. 6 is a schematic illustration of smart-device ecosystem 600 having smart-devices that are identified as secondary authentication devices 116 based upon pairing relationships, in accordance with an embodiment.

In certain embodiments, it may be beneficial to automatically determine secondary devices 116 based upon other devices paired with previously registered secondary devices 116. For example, in one embodiment, an electronic control unit 602 of a vehicle 604 may be registered as a secondary device 116. The control unit 602 may pair with other devices (e.g., a smart phone 606), such that functionalities of the other devices may be used in conjunction with the functionalities of the control unit 602. For example, the smart phone 606 may pair with the control unit 602 to enable the vehicle 604 to control functions of the smart phone 606, such as receiving calls, sending calls, etc. over the vehicle's speaker and/or microphone system.

Despite these other devices pairing with the secondary devices for purposes other than registering the secondary devices 116 with the backend system 102 or authenticating a user via the backend system 102, this pairing of devices with previously registered secondary devices 116 may be harnessed to derive additional devices that may be registered as secondary devices 116 that provide authentication information.

The process 500 may begin by identifying trusted devices (block 502). For example, previously registered secondary devices 116 (e.g., devices that are associated with a particular user and/or user profile) may be identified. In the vehicle 606 embodiment of FIG. 6, the control unit 602 may be a previously registered secondary device 116.

Based upon the identified trusted devices, additional devices may be identified that may be useful as secondary devices 116 (block 504). In one embodiment, upon pairing with the client 114, the secondary devices 116 may provide an indication of other paired devices that may be useful as secondary devices. Alternatively, the client 114 may request an indication of devices paired with the registered secondary devices 116, receive the indication from the registered secondary devices 116, and may determine particular ones of the paired devices that should be registered. This may be particularly beneficial for authentication purposes because the paired devices may act as an identifier of the user.

As more and more secondary devices 116 are added (e.g., recursively), an authentication confidence factor may increase, because authenticating a user using more secondary devices 116 (or information from the secondary devices 116) may provide unpredictable, complex, and highly secure verification of a user. In contrast to systems that merely provide a username and password combination with a secondary personal question about the user, the systems provided herein may become increasingly sophisticated with relatively little user interaction. For example, along with a username and password combination, authentication may look at discernible characteristics of the environment, secondary devices, etc. associated with the request for electronic action is made, such as location information, secondary device identifiers, etc. Thus, information about the location of the source of the request may relate to the user's office or home and may increase the likelihood that the user is authentic. Further, the more known secondary devices 116 that can be identified may increase the likelihood of an authentic user. For example, identifying a paired cellular telephone associated with the user may increase the likelihood of an authentic user. When additional secondary devices 116 (e.g., smart locks, routers, computers, etc.) are identified, the likelihood may continue to increase.

For example, in the vehicle 604 embodiment of FIG. 6, the client 1114 may receive an indication from the control unit 602 that the smart phone 606 pairs with the control unit 602. Thus, the client may identify the smart phone 606 as device associated with a trusted device (e.g., the control unit 602).

Next, the devices associated with the trusted device may be registered (e.g., authenticated/trusted) (block 506). For example, the registration of the associated device may occur according to process 400 of FIG. 4, as discussed above. Returning to the vehicle 604 embodiment of FIG. 6, the smart phone 606 may be registered as a secondary device 116 because of its association with the control unit 602 of the vehicle 604. As mentioned above, the registration process may include obtaining authentication information and/or other information for the new secondary device (block 404 of FIG. 4). To do this, in some embodiments, information from the new secondary device being registered (e.g., the smart phone 606) may be obtained by the previously registered secondary device 116 (e.g., the control unit 602) and propagated to the backend system 102 and/or incorporated into the block chain 304. Alternatively, in some embodiments, the new secondary device may provide the authentication and/or other data to the backend system 102 without going through the previously registered secondary device 116 (e.g. via the Internet, as illustrated by arrow 608).

In some embodiments, a chain of secondary devices 116, may be used to identify and register additional secondary devices 116. For example, in FIG. 6, a home automation system (HAS) 610 may be registered as a secondary device 116. The HAS 610 may be communicatively coupled with the client 114 and a plurality of devices associated with a household 612, such as a wearable fitness monitor 614 and/or the vehicle 604 (e.g., via a home communications network 616). By virtue of the registration of the HAS 610, a subset or all of the devices associated (e.g., communicatively coupled or paired) with the HAS 610 may be identified and registered for use in multi-factor authentication. For example, the smart phone 606 may pair with the vehicle 604 (e.g., via the control unit 602). The control unit 602 may pair with the HAS 610, which is registered with the backend system 102. Accordingly, the smart phone 606 and the control unit 602 may be identified as secondary devices 116.

In some embodiments, a root device (e.g., a device having a chain of sub-devices) may provide an indication, such as indication 616 that provides an indication of the sub-devices and their authentication and/or other information. For example, in the indication 616, the HAS 610 is the root device that provides authentication information 618 for the HAS 610 as well as an indication 620 and 622 of sub-devices (e.g., the fitness wearable 614 and the vehicle control unit 602, respectively). Authentication information and/or other information 624 and 626 related to these devices is also provided. Further, because the vehicle control unit 602 pairs with the smart phone 606, an indication 628 may indicate that the smart phone 606 is a sub-device of the HAS 610 and/or control unit 602. Authentication and/or other information 630 about the smart phone 606 may also be provided.

As mentioned above, this is only one manner that the authentication information and/or other information may be provided to the backend system 102. In some embodiments, the authentication information and/or other information may be provided via a root device, while in other embodiments, the sub-devices may provide the information to the backend system 102 without going through the root device. Further, in some embodiments, the client system 114 may receive and propagate the authentication information and/or other information to the backend system 102, while in other embodiments, the authentication information and/or other information may be provided to the backend system without going through the client system 114.

Multi-Factor Authentication Via Paired Devices

Figure 7:
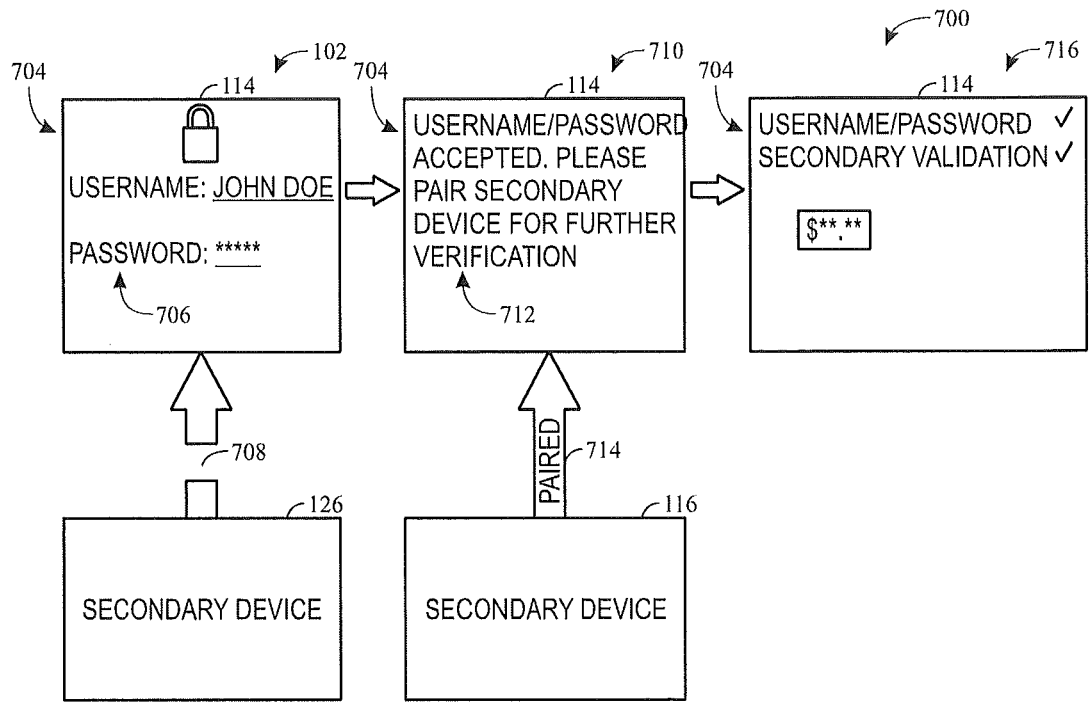
FIG. 7 is a schematic representation of a progression of multi-factor authentication provided by a paired secondary device, in accordance with an embodiment.
Figure 8:
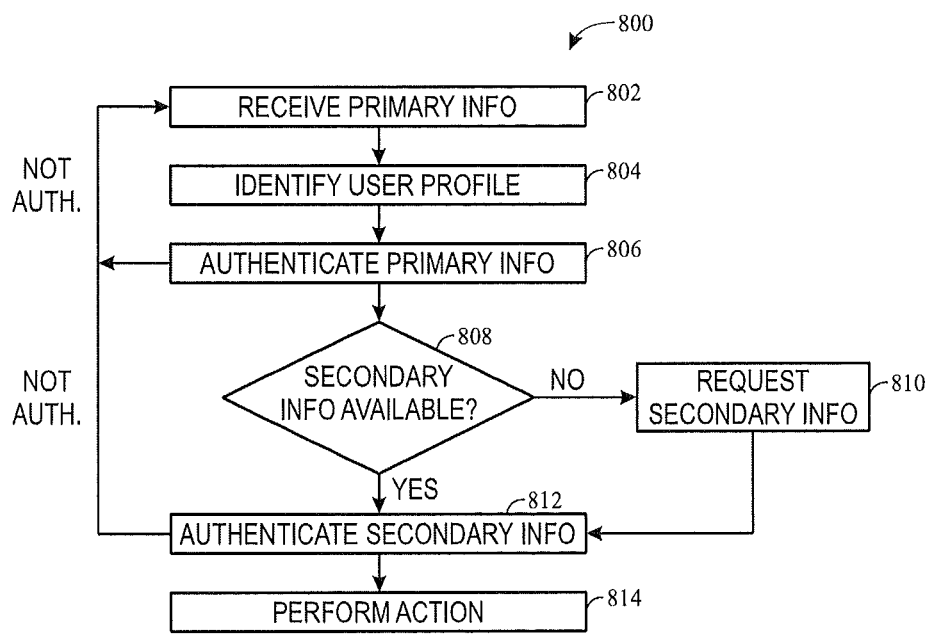
FIG. 8 is a flowchart illustrating backend processing for requesting and authenticating the secondary authentication information, in accordance with an embodiment.

Once secondary devices 116 are registered, the authentication information and/or other information may be used to provide multi-factor authentication. FIG. 7 is a schematic progression 700, illustrating multi-factor authentication provided by pairing a secondary device 116 with the client system 114, specifically detailing a client-side GUI 704, in accordance with an embodiment. FIG. 8 is a flowchart illustrating backend 102 processing 800 for requesting and authenticating the secondary authentication information, in accordance with an embodiment. For clarity FIGS. 7 and 8 will be discussed together.

In the first progression frame 702 of the progression 700, to facilitate an electronic data action request, the client system 114 may provide a GUI 704. The GUI 704 may provide a prompt 706, asking a user for primary authentication information (e.g., a username and password combination).

Upon submission of data associated with the prompt 706, the backend system 102 may receive the primary authentication information (block 802). As mentioned above, the primary authentication information may identify a user and/or user profile that is requesting the electronic data action. Thus, a user profile may be identified from the primary authentication information (block 804).

Based upon information in the identified user profile, the primary authentication data may be authenticated (block 806). For example, the user profile may identify a particular password associated with the user profile. The password may be compared with a password provided by the prompt 706. When there is a match, the primary authentication information may be authenticated.

If the primary authentication information cannot be authenticated, the backend system process 800 may restart. The GUI 704 may indicate that the primary authentication information was not valid and request new primary authentication information from the user.

However, when the primary authentication information is authenticated, the backend system 102 may determine if secondary authentication information is available (decision block 808). When secondary authentication information is not available, the backend system 102 may request the secondary authentication information (block 810).

For example, as illustrated by broken arrow 708, the secondary device 116 may not be paired with the client system 114 when the user provides the primary authentication information. The backend system 102 may expect an indication that a particular secondary device 116 is paired with the client system 114 to provide the secondary authentication. However, because the secondary device 116 is not paired with the client system 114, the secondary authentication information is not available. Accordingly, the backend system 102 may request that the secondary device 116 be paired with the client system 114. This request may be provided directly to the secondary device 116 and/or to the client system 114, which may, in some embodiments, result in the client system 114 providing instructions based upon the request. For example, as illustrated in the second progression frame 710, the user is provided instructions 712 to pair the secondary device 116 with the client system 114.

As mentioned above, secondary device 116 pairing with the client system 114 is only one secondary authentication possibility. In other embodiments, information provided by the secondary device 116, such as a stored cookie or token, characteristics of the secondary device 116, such as MAC address and/or location information may be used for secondary authentication (and thus requested by the process 800). Further, multiple such authentications may be cumulatively used and compared for overlap with an established pattern or model.

Upon pairing the secondary device 116 with the client system 114 (as indicated by pairing arrow 714) or otherwise making the secondary authentication information available, the backend system 102 may authenticate the secondary information (block 812). For example, the backend system 102 may verify that the expected pairing indication is valid, that an expected MAC address and/or location of the secondary device 116 is provided, etc. If the secondary authentication information cannot be authenticated, the process 800 may restart.

However, when the secondary authentication information is authenticated, the electronic data action may be performed (block 814). For example, as illustrated in the third progression frame 716, access to financial records may be provided by the GUI 704, after the primary and secondary authentication information is authenticated.

Multi-Factor Authentication Via Public Clients

Figure 9:
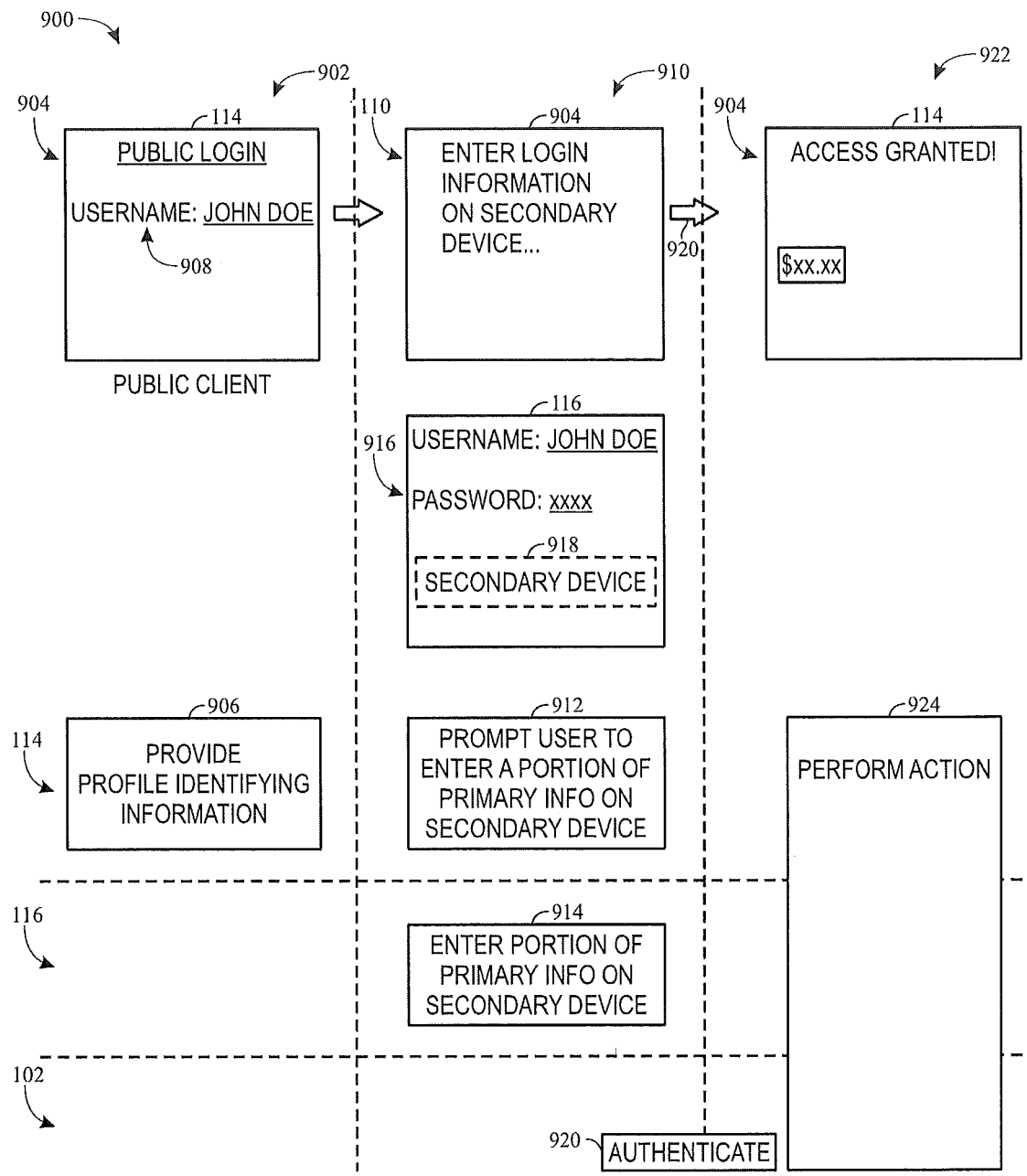
FIG. 9 is a schematic representation of a progression of multi-factor authentication that may occur using a public client, in accordance with an embodiment.

In some embodiments, a user may desire to access sensitive content (e.g., financial records, etc.) via clients that are exposed to a public audience. For example, a user may attempt to access financial records from a public library computer, shared work computer, etc. In such scenarios, it may be beneficial to provide alternative mechanisms for providing primary and/or secondary authentication information. For example, nefarious public computer users may install keystroke recording applications that other users may not be aware of. These keystroke recording applications may detect and store authentication information, such as username and password combinations, which may be used by these nefarious public computer users to impersonate client system 114 users. Accordingly, FIG. 9 is a schematic progression 900 of multi-factor authentication that provides heightened safety when occurring on a public client, in accordance with an embodiment. In one embodiment, to increase safety, a portion of the primary authentication information may be provided by the secondary device 116 to protect that portion of the primary authentication data.

In the current embodiment, a client system 114 begins a session in the first progression frame 902 by a user providing a user profile identifying portion of the primary authentication information in a public login GUI 904 of the client system 114 (block 906). For example, in the current embodiment, the user provides a username 908 at the client system 114.

As illustrated in the second progression frame 910, the user may then be prompted by the client system 114 or the secondary device 116 to enter a portion of the primary authentication information on the secondary device 116 (block 912). As illustrated by GUI 904', in the current embodiment, the user is prompted by the client system 114. However, additionally and/or alternatively, the user may be prompted at the secondary device 116 (e.g., a smart phone).

Based upon this prompting, the user may provide the portion of the primary authentication information on the secondary device 116 (block 914). For example, in the current embodiment, a password 916 is provided. In some embodiments, a confirmation of the portion provided in block 906 may also be provided. For example, in the current embodiment, the username may also be provided on the secondary device 116. In alternative embodiments, only the portion not provided in block 906 may be provided via the secondary device 116.

When multi-factor authentication is implemented, secondary authentication information (e.g., secondary device information 918) may automatically be provided when the portion of the primary authentication information is provided via the secondary device 116. Using the portions of the primary authentication information and/or the secondary authentication information, the backend system may authenticate the user (block and arrow 920).

As illustrated in the third progression frame 922, when the authentication information is authenticated, the requested electronic data action may be performed (block 924). As illustrated, depending on the action to perform, this performance may be facilitated by the client 114, the secondary device 116, and/or the backend system 102. In one embodiment, the backend system 102 may provide access to data, while the client system 114 and/or the secondary system 116 provide a visualization of the data. For example, as illustrated by the GUI 904", a visualization of data accessed from the backend system 102 is provided by the client system 114.

Figure 10:
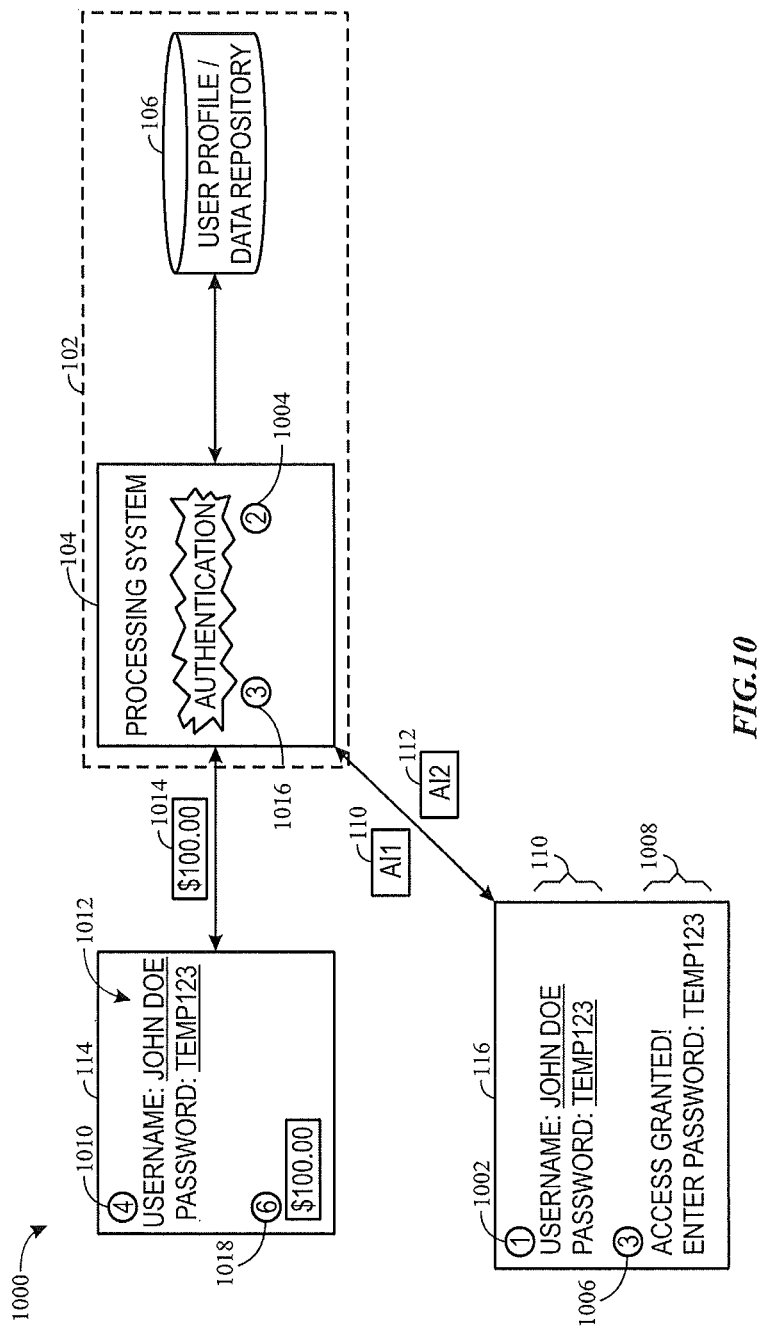
FIG. 10 is a schematic representation of a progression of multi-factor authentication initiated by a secondary device, in accordance with an embodiment.

In contrast to the embodiment of FIG. 9, in some embodiments, the authentication process may be initiated from the secondary devices 116. FIG. 10 is a schematic diagram illustrating a progression 1000 for authentication initiated by a secondary device 116, in accordance with an embodiment.

As illustrated in FIG. 10, in a first step 1002, a user may enter primary authentication information 110 at the secondary device 116. This primary authentication information may be provided to the backend system 102 (e.g., the processing system 104). Further, in some embodiments, secondary authentication information 112 may be provided to the backend system 102. In the current embodiment, the secondary authentication information 112 is provided by the secondary device 116, however, in alternative embodiments, the secondary authentication information 112 may be provided by the client system 114.

The primary authentication information and/or the secondary authentication information may be authenticated in a second step 1004. For example, when the primary authentication information is a username and password combination, the user profile/data repository 106 may be queried to determine whether the combination is valid. Further, when a MAC address or other unique identifier of the secondary device is provided by the secondary device 116 as the primary authentication information 110 and/or the secondary authentication information 112, the backend system may determine whether or not the identifier is associated with the user's profile.

Upon authentication, in a third step 1006, the backend system 102 may provide an indication of temporary information (e.g., a temporary username and/or password 1008) that may be used to access the backend system 102 from the client 114. This temporary information may be presented to the user by the secondary device 116.

In a fourth step 1010, the user may input the temporary information (e.g., the temporary username and/or password 1008) at a login GUI 1012 of the client system 114. The temporary login information 1014 may be provided from the client system 114 to the backend system 102, where the temporary login information 1014 may be authenticated in a fifth step 1016. The temporary login information may only be valid for a temporary time window (e.g., 30 seconds, 5 mins, 1 hour, etc.). If the temporary login information is not used within that time window, the temporary login information may not be authenticated, which results in denial of performance of the electronic data actions.

However, when the temporary login information 1014 is authenticated in the fifth step 1016, the action may be performed in a sixth step 1018. For example, in the current embodiment, the financial records 1020 are accessed and displayed at the client system 114.

As may be appreciated, secondary devices may provide enhanced authentication when requesting performance of electronic data actions, such as accessing, modifying, and/or displaying electronic data. In certain embodiments, multi-factor authentication may be facilitated by using information from the secondary devices as additional authentication factors to a primary authentication factor. Additionally and/or alternatively, these secondary devices may enhance secure logins when using a public client system.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
a backend system configured to:
receive a first request to facilitate an electronic data action request from a client system;
receive primary authentication information associated with a user from the client system;
identify a user profile associated with the user based on the primary authentication information, wherein the user profile comprises information regarding a pairing between a secondary device and the client system;
determine whether secondary authentication information from the secondary device has been received via the client system;
send a second request to the client system to perform an operation to pair the secondary device to the client system in response to the secondary authentication information not being received; and
perform the electronic data action request in response to the secondary authentication information being received.
2. The system of claim 1, wherein the primary authentication information comprises a username and a password.

3. The system of claim 1, wherein the secondary authentication information comprises a cookie, a token, a characteristic associated with the secondary device, or any combination thereof.

4. The system of claim 3, wherein the characteristic comprises a media access control (MAC) address associated with the secondary device.

5. The system of claim 3, wherein the characteristic comprises a location associated with the secondary device.

6. The system of claim 1, wherein the backend system is configured to send a third request to the secondary device to perform an additional operation to pair the secondary device to the client system in response to the secondary authentication information not being received.

7. The system of claim 1, wherein the electronic data action request comprises a request to access user-specific financial records.

8. The system of claim 1, wherein the secondary device comprises a smart phone, a vehicle, a wearable device, or a home automation system.

9. The system of claim 1, wherein the backend system is configured to:
determine whether a plurality of authentication datasets from a plurality of secondary devices has been received via the client system; and
perform the electronic data action request in response to the plurality of authentication datasets being received.

10. A method, comprising:
sending, via a processor, a first request to facilitate an electronic data action request to a backend system;
sending, via the processor, primary authentication information associated with a user to the backend system;
receiving, via the processor, a user profile associated with the user from the backend system, wherein the backend system is configured to identify the user profile based on the primary authentication information, and wherein the user profile comprises information regarding a pairing between a secondary device and the processor;
receiving, via the processor, a second request to perform an operation to pair with the secondary device, wherein the request is sent from the backend system in response to not receiving secondary authentication information;
pairing, via the processor, with the secondary device; and
sending a command to the secondary device to send the secondary authentication information to the backend system after the secondary device has been paired to the processor, wherein the backend system is configured to perform the electronic data action request in response to the secondary authentication information being received.

11. The method of claim 10, wherein the secondary authentication information comprises a media access control (MAC) address of the secondary device.

12. The method of claim 10, wherein the primary authentication information comprises biometric information obtained via one or more sensors of the secondary device.

13. The method of claim 10, wherein the secondary device comprises a smart phone, a vehicle, a wearable device, or a home automation system.

14. A tangible, non-transitory, machine-readable medium, comprising machine-readable instructions, when executed, cause a processor to:
receive a first request to facilitate an electronic data action request from a client system;
receive primary authentication information associated with a user from the client system;
identify a user profile associated with the user based on the primary authentication information, wherein the user profile comprises information regarding a pairing between a plurality of secondary devices and the client system;
determine whether secondary authentication information from the plurality of secondary devices has been received via the client system;
send a second request to the plurality of secondary devices to perform an operation to pair the plurality of secondary devices to the client system in response to the secondary authentication information not being received; and
perform the electronic data action request in response to the secondary authentication information being received.

15. The machine-readable medium of claim 14, wherein the plurality of secondary devices comprises a smart phone, a vehicle, a wearable device, a home automation system, or any combination thereof.

16. The machine-readable medium of claim 14, wherein the primary authentication information comprises a username and a password.

17. The machine-readable medium of claim 16, comprising instructions, that when executed, are configured to cause the processor to render a graphical user interface that prompts the user to enter the username and the password.

18. The machine-readable medium of claim 14, comprising instructions, that when executed, are configured to cause the processor to determine a confidence factor for authenticating the user based on a number of plurality of secondary devices.

19. The machine-readable medium of claim 14, wherein the primary authentication information comprises biometric information obtained via one or more sensors.

* * * * *